United States Patent [19]
Yoldas et al.

[11] Patent Number: 4,753,827
[45] Date of Patent: Jun. 28, 1988

[54] ABRASION-RESISTANT ORGANOSILOXANE/METAL OXIDE COATING

[75] Inventors: Bulent E. Yoldas, Pittsburgh; Chia-Cheng Lin, Gibsonia, both of Pa.

[73] Assignee: PPG Industries, Inc., Pittsburgh, Pa.

[21] Appl. No.: 914,856

[22] Filed: Oct. 3, 1986

[51] Int. Cl.$^4$ .............................................. B05D 3/02
[52] U.S. Cl. ..................................... 427/387; 528/25; 528/29; 428/447
[58] Field of Search ................... 528/25, 29; 427/387; 428/447

[56] References Cited

U.S. PATENT DOCUMENTS

| | | | |
|---|---|---|---|
| 3,004,863 | 10/1961 | Gray, Jr. et al. | 117/94 |
| 3,582,395 | 6/1971 | Adams et al. | 117/124 |
| 3,817,905 | 6/1974 | Lerner et al. | 524/780 |
| 3,941,719 | 3/1976 | Yoldas | 252/463 |
| 3,944,658 | 3/1976 | Yoldas | 423/626 |
| 3,986,997 | 10/1976 | Clark | 260/29.2 |
| 4,027,073 | 5/1977 | Clark | 428/412 |
| 4,042,749 | 8/1977 | Sandvig | 427/44 |
| 4,073,967 | 2/1978 | Sandvig | 427/389.7 |
| 4,084,021 | 4/1978 | Sandvig | 427/386 |
| 4,208,475 | 6/1980 | Paruso et al. | 429/193 |
| 4,242,403 | 12/1980 | Mattimoe et al. | 428/213 |
| 4,244,986 | 1/1981 | Paruso et al. | 427/126.4 |
| 4,271,210 | 6/1981 | Yoldas | 427/169 |
| 4,275,118 | 6/1981 | Baney et al. | 428/412 |
| 4,278,632 | 7/1981 | Yoldas | 264/66 |
| 4,286,024 | 8/1981 | Yoldas | 428/446 |
| 4,293,594 | 10/1981 | Yoldas et al. | 427/107 |
| 4,357,427 | 11/1982 | Ho et al. | 501/153 |
| 4,390,373 | 6/1983 | White et al. | 106/287 |
| 4,405,679 | 8/1983 | Fujioka et al. | 428/216 |
| 4,442,168 | 4/1984 | White et al. | 428/331 |
| 4,477,499 | 10/1984 | Doin et al. | 427/412 |
| 4,500,669 | 2/1985 | Ashlock et al. | 524/440 |
| 4,568,578 | 2/1986 | Arfsten et al. | 428/34 |
| 4,571,365 | 2/1986 | Ashlopck et al. | 428/412 |

FOREIGN PATENT DOCUMENTS

| | | |
|---|---|---|
| 0128697 | 12/1984 | European Pat. Off. |
| 0170295 | 2/1986 | European Pat. Off. |
| 1494209 | 12/1977 | United Kingdom |

OTHER PUBLICATIONS

G. Haas et al., *Physics of Thin Films*, vol. 5, pp. 134–139, (1969).
*Journal of Applied Polymer Science*, vol. 26, 2381–2389 (1981).
*Journal of Non-Crystalline Solids*, vol. 63 (1984), pp. 283–292.
*Polymer Bulletin*, No. 14 (1985).

Primary Examiner—Melvyn I. Marquis
Attorney, Agent, or Firm—Donna L. Seidel

[57] ABSTRACT

An organoalkoxysilane/metal oxide sol-gel composition and method for its production are disclosed whereby an organoalkoxysilane of the general formula $$R_xSi(OR')_{4-x}$$

wherein R is an organic radical, R' is a low molecular weight alkyl radical, and x is at least 1 and less than 4, is partially hydrolyzed in organic solution and reacted with a titanium or zirconium alkoxide of the general formula $M(OR'')_4$ wherein M is titanium or zirconium and R'' is a lower alkyl radical. The composition is hydrolyzed, dried and condensed to form an organosiloxane/metal oxide abrasion-resistant coating on a substrate.

20 Claims, No Drawings

ABRASION-RESISTANT ORGANOSILOXANE/METAL OXIDE COATING

FIELD OF THE INVENTION

The present invention relates generally to the art of abrasion-resistant coatings, and more particularly to the art of abrasion-resistant inorganic coatings on abrasion-prone organic substrates.

BACKGROUND

U.S. Pat. No. 3,004,863 to Gray et al teaches increasing the scratch resistance of glass by applying to the glass surface an acidic aqueous solution of an organic titanate ester composition and heating at a temperature sufficient to anneal the glass.

U.S. Pat. No. 3,582,395 to Adams et al discloses a method for increasing the scratch resistance of glass by treating the surface at a temperature between the strain point and the softening point with an alkylsilyl titanate to form a protective coating of silica-titania.

U.S. Pat. No. 3,986,997 and No. 4,027,073 to Clark disclose an acidic dispersion of colloidal silica and hydroxylated silsesquioxane in an alcohol-water medium coated onto substrates such as acrylic lenses to provide an abrasion-resistant coating.

U.S. Pat. No. 4,242,403 to Mattimoe et al describes multi-layer automotive glazing units that include transparent substrates with protective covers, and that combine penetration resistant body portions with abrasion resistant surfaces of a silica-reinforced organopolysiloxane.

U.S Pat. No. 4,275,118 to Baney et al discloses a coating composition comprising an acidic dispersion of colloidal titania, colloidal silica and hydroxylated silsesquioxane in an alcohol-water medium which produces a hard, abrasion-resistant coating when cured on a plastic surface such as polycarbonate.

U.S. Pat. No. 4,390,373 and No. 4,442,168 to White et al. describe a coating composition comprising an effective abrasion resisting amount of a colloidal dispersion containing colloidal antimony oxide and colloidal silica in a water-alcohol solution of the partial condensate of an organosilanol which upon curing forms an improved transparent, abrasion-resistant coating.

U.S. Pat. No. 4,405,679 to Fujioka et al discloses a coated shaped article of a polycarbonate type resin of improved abrasion resistance comprising a shaped polycarbonate substrate, an undercoat applied and cured on the substrate, and an overcoat applied and cured on the undercoat comprising a hydrolyzate of an epoxy-containing silicon compound, at least one member of the group of hydrolyzates of organic silicon compounds, colloidal silica and organic titania compounds, and a curing catalyst.

U.S. Pat. No. 4,477,499 to Doin et al discloses ultraviolet radiation resistant silicone resin coatings having improved thermoformability and shortened required aging achieved by the addition of a Lewis acid compound to the coating composition.

U.S. Pat. No. 4,500,669 and 4,571,365 to Ashlock et al disclose transparent, abrasion-resistant coating compositions comprising a colloidal dispersion of a water-insoluble dispersant in a water-alcohol solution of the partial condensate of silanol wherein the dispersant comprises metals, alloys, salts, oxides and hydroxides thereof.

European patent application No. 85110293.9 published 05.02.86 discloses carbon-containing monolithic glasses prepared by a sol-gel process involving a partial condensate of a silanol containing colloidal metal oxides such as $SnO_2$, $B_2O_3$ and $ZnO_2$.

U.S. patent application Ser. No. 915,344 filed on even date herewith by Lin et al discloses sol-gel compositions containing silane and alumina, and abrasion resistant coatings produced therefrom.

SUMMARY OF THE INVENTION

The present invention, recognizing the deficiencies of organic protective coatings, provides an abrasion-resistant coating composition comprising an organoalkoxysilane and a hydrolyzable compound of a metal such as titanium or zirconium. Such a composition is formed by producing active soluble and polymerizable titanium or zirconium species from titanium or zirconium alkoxides and dispersing or polymerizing the titanium or zirconium species into silicon-oxygen networks of organosiloxane polymers via reaction with silanol groups. The presence of titanium or zirconium in the polymer network modifies such properties as the hardness and refractive index of the polymer. When such a titanium or zirconium modified polymer coating is applied to a plastic substrate surface, the coating increases the chemical resistance, index of refraction and blocking of ultraviolet radiation, in addition to the abrasion resistance.

DETAILED DESCRIPTION OF THE PREFERRED EMBODIMENT

A sol-gel system for producing a silane/titania or silane/zirconia composition may be prepared in the following manner. First, an organoalkoxysilane of the general formula $R_xSi(OR')_{4-x}$, wherein R is an organic radical, R' is a low molecular weight alkyl radical, and x is at least one and less than 4, is partially hydrolyzed. Preferably, R is selected from the group consisting of low molecular weight, preferably 1 to 6 carbon atoms, alkyl or vinyl, methoxyethyl, phenyl, γ-glycidoxypropyl or γ-methacryloxypropyl, and R' is selected from the group consisting of methyl, ethyl, propyl and butyl. Preferred organoalkoxysilanes include those wherein R is methyl and R' is ethyl. A Particularly preferred organoalkoxysilane is methyl triethoxysilane. The organoalkoxysilanes of the present invention may contain functional groups as well. For example, another preferred organoalkoxysilane is γ-glycidoxypropyl trimethoxysilane. Mixtures of organoalkoxysilanes may also be preferred.

The organoalkoxysilane of the present invention is preferably dissolved in an organic solvent, preferably an alcohol, and partially hydrolyzed with water according to the following general reaction

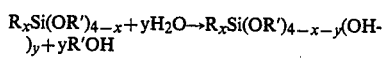

wherein y is less than $4-x$.

After the organoalkoxysilane is partially hydrolyzed, a titanium or zirconium alkoxide is added having the following general formula

wherein M is Ti or Zr and R" is a low molecular weight alkyl radical, preferably methyl, ethyl, propyl or butyl. The metal alkoxide may be in dimer or higher condensed form so long as alkoxy groups remain reactive with silanol groups of the partially hydrolyzed organoalkoxysilane to copolymerize. The titanium or zirconium alkoxide reacts with the partially hydrolyzed organoalkoxysilane to form a network of silicon-oxygen-metal bonds according to the following general reaction

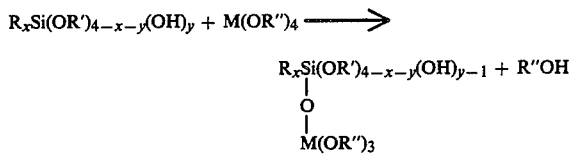

When the titanium or zirconium alkoxide has completely reacted with the partially hydrolyzed organoalkoxysilane, additional water is added to hydrolyze the composition, i.e., to convert remaining alkoxy groups of either the alkoxysilane or the metal alkoxide to hydroxyl groups according to the reaction

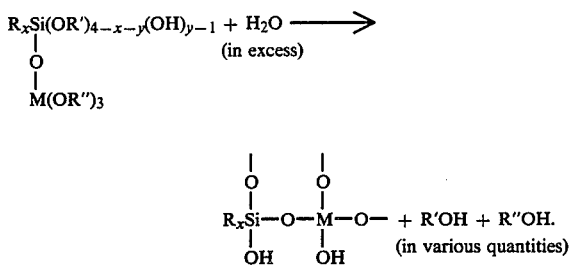

Preferably, the fully hydrolyzed composition is applied by any conventional procedure such as spraying, dipping or flow coating onto a surface of a substrate. The coating composition is dried to remove alcohol and water solvents, and then heated to promote the continued condensation polymerization of the composition, and curing to a dense glassy abrasion resistant film.

Substrates which can be improved in their abrasion resistance and other properties with the organoalkoxysilane/metal oxide compositions of the present invention include polycarbonate and acrylic, particularly as used for vehicle transparencies. Abrasion resistance is measured by ASTM F-735 abrasion testing (Bayer abrasion) using 1000 grams of quartz sand of 6 to 14 mesh size range for 300 cycles. Coating compositions of the present invention may also be used on nonplastic substrates such as glass, ceramics and metals to improve corrosion resistance or other properties.

The present invention will be further understood from the descriptions of specific examples which follow.

EXAMPLE I

An abrasion resistant coating composition is prepared as follows. A solution is prepared comprising 100 grams of γ-glycidoxypropyl trimethoxysilane

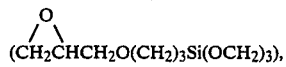

100 grams of ethyl alcohol, 8 grams of water for hydrolysis and 0.3 grams of nitric acid. The solution is stirred for 10 minutes at room temperature to partially hydrolyze the organoalkoxysilane and completely react the water. A clear sol is formed, to which is added 40 grams of titanium tetraethoxide (Ti(OC$_2$H$_5$)$_4$). The mixture is stirred for 20 minutes to completely react the titanium tetraethoxide with the partially hydrolyzed organoalkoxysilane. Finally, an additional 20 grams of water is introduced to complete the hydrolysis of the organoalkoxysilane/titania composition, along with an additional 60 grams of alcohol to adjust the solution concentration to a suitable level for coating application.

A polycarbonate substrate is cleaned, primed with an aminosilane by dipping for 7 minutes into A1120 from Union Carbide, rinsing with 2-propanol then water, and drying for half an hour at 60° C. to 80° C. The primed substrate is then immersed into the above-described organoalkoxysilane/titania composition, and withdrawn at a rate of 10 centimeters per minute. The coated substrate is heated to 130° C. in an oven and held at that temperature for 2 hours to cure the coating. After cooling to room temperature, the coated substrate is subjected to 300 cycles of Bayer abrasion using 1000 grams of quartz sand of 6 to 14 mesh size. Following the abrasion testing, the coated substrate measures 3.6 percent haze, compared with 60 to 65 percent haze for an uncoated polycarbonate substrate after 300 cycles of Bayer abrasion testing.

EXAMPLE II

An abrasion resistant coating composition is prepared as in Example I except that titanium isopropoxide (Ti(OC$_2$H$_2$)$_4^i$) is used. The coating composition is applied, dried and cured as in the previous example. After 300 cycles of Bayer abrasion testing, the sample measures 2.8 percent haze compared with 60 to 65 percent haze for uncoated polycarbonate after 300 cycles of Bayer abrasion testing.

EXAMPLE III

An abrasion resistant coating composition is prepared as in the previous example except that zirconium isopropoxide (Ar(OC$_3$H$_7$)$_4^i$) is used. The composition is applied, dried and cured as in the previous examples. After 300 cycles of Bayer abrasion testing, the sample has 5.3 percent haze compared with 60 to 65 percent haze for an uncoated polycarbonate substrate after 300 cycles of Bayer abrasion testing.

EXAMPLE IV

An abrasion resistant coating composition is prepared by combining 40 grams of 2-propanol, 8 grams of water and 10 drops of concentrated nitric acid, adding 100 grams of γ-glycidoxypropyl

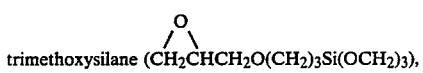

trimethoxysilane (CH$_2$CHCH$_2$O(CH$_2$)$_3$Si(OCH$_2$)$_3$), and stirring for 10 minutes to partially hydrolyze the organoalkoxysilane and completely react the water. To the partially hydrolyzed organoalkoxysilane is added 45 grams of zirconium isopropoxide (Zr(OC$_3$H$_2$)$_4^i$). The mixture is stirred for an additional 20 minutes to allow reaction of the zirconium isopropoxide with the partially hydrolyzed organoalkoxysilane. Finally, the composition is fully hydrolyzed by adding 185 grams of deionized water. Two grams of ammonium perchlorate may be added as an epoxy-curing catalyst. To promote wetting of the substrate, 2 drops of Zonyl FSN surfactant from Dupont is added to the composition.

A polycarbonate substrate ⅛ inch (about 3 millimeters) thick is primed with an aminosilane and dipped for 1 minute in the above-described composition as in the previous examples. The coated substrate is air-dried for half an hour, then heated to 130° C. over a period of one hour and held at 130° C. for 3 hours. After cooling to room temperature, the optical properties of the coated substrate are measured to be 89.1 percent transmittance and 0.6 percent haze. After 300 cycles of Bayer abrasion testing, the coated sample has 88.8 percent transmittance and 1.3 percent haze compared with 60 to 65 percent haze for uncoated polycarbonate after 300 cycles of Bayer abrasion testing.

EXAMPLE V

An abrasion resistant coating composition is prepared by combining 50 grams of γ-glycidoxypropyl trimethoxysilane

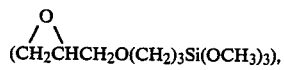
$(CH_2CHCH_2O(CH_2)_3Si(OCH_3)_3)$, and 25 grams of methyl triethoxysilane $(CH_3Si(OC_2H_5)_3)$, and adding 30 grams of 2-propanol, 8 grams of deionized water and 5 drops of concentrated hydrochloric acid. This mixture is stirred for 10 minutes at room temperature to partially hydrolyze the silanes. Then 20 grams of zirconium n-propoxide $(Zr(OC_3H_7)_4{}^n)$ is added, and the mixture is stirred for 20 minutes to allow reaction of the zirconium n-propoxide with the partially hydrolyzed silanes. To fully hydrolyze the composition, 20 grams of deionized water is added.

A polycarbonate substrate is primed, coated and cured as in the previous example. After 300 cycles of Bayer abrasion testing, the haze is 4.3 percent, compared with 60 to 65 percent haze for uncoated polycarbonate after 300 cycles of Bayer abrasion testing.

The above examples are offered to illustrate the present invention. Various organoalkoxysilanes and titanium or zirconium alkoxides may be used in a wide range of proportions, solvents and concentrations, and cured using different temperatures and cycles. Any wetting agent, UV absorber or other additive compatible with the composition may be used in any amount which does not interfere with network formation. Various plastic substrates, including polycarbonate and acrylic, and nonplastic substrates, such as glass and metal, may be coated with compositions in accordance with the present invention, the scope of which is defined by the following claims.

We claim:

1. A composition of matter comprising the condensation polymerization reaction product of:
   a. an organoalkoxysilane or mixture of organoalkoxysilanes of the general formula $R_xSi(OR')_{4-x}$ wherein R is an organic radical, R' is a low molecular weight alkyl radical and x is at least 1 and less than 4, and wherein said organoalkoxysilane or mixture of organoalkoxysilanes is partially hydrolyzed;

b. an alkoxide of a metal selected from the group consisting of titanium and zirconium; and
   c. sufficient water to hydrolyze the reaction product of a. and b.

2. A composition according to claim 1, wherein R is selected from the group consisting of lower alkyl, vinyl, methoxyethyl, phenyl, γ-glycidoxypropyl and γ-methacryloxypropyl.

3. A composition to claim 1, wherein R+ is selected from the group consisting of methyl, ethyl, propyl and butyl.

4. A composition according to claim 3, wherein R is methyl and R' is ethyl.

5. A composition according to claim 4, wherein x is 1.

6. A composition according to claim 1, wherein said alkoxide has the general formula $Zr(OR'')_4$ wherein R'' is a low molecular weight alkyl radical.

7. A composition according to claim 6, wherein the zirconium alkoxide is zirconium isopropoxide.

8. A composition according to claim 1, wherein said organoalkoxysilane comprises an organoalkoxysilane which comprises an epoxy-containing alkyl radical.

9. A composition according to claim 1, wherein said mixture of organoalkoxysilanes comprises an epoxyalkoxysilane in combination with an alkylalkoxysilane.

10. A composition according to claim 9, wherein said mixture of organoalkoxysilanes comprises γ-glycidoxypropyl trimethoxysilane and methyl triethoxysilane and said metal alkoxide is zirconium isopropoxide.

11. A method of making an organoalkoxysilane-metal oxide composition comprising the steps of:
   a. partially hydrolyzing in organic solution an organoalkoxysilane of the general formula

   $R_xSi(OR')_{4-x}$ wherein R is an organic, R' is a low molecular weight alkyl radical, and x is at least 1 and less than 4;
   b. adding to said partially hydrolzed organoalkoxysilane a metal alkoxide selected from the group consisting of titanium alkoxides and zirconium alkoxides;
   c. reacting said metal alkoxide with said partially hydrolyzed organoalkoxysilane; and
   d. adding additional water to hydrolyze the composition.

12. A method according to claim 11, wherein the step of partially hydrolyzing said organoalkoxysilane is carried out in alcohol.

13. A method according to claim 12, wherein the step of partially hydrolyzing said organoalkoxysilane is carried out in 2-propanol.

14. A method according to claim 12, wherein the step of partially hydrolyzing said organoalkoxysilane is carried out in ethanol.

15. A method according to claim 12, wherein said metal alkoxide is zirconium isopropoxide.

16. A method according to claim 11, further comprising the step of drying said composition to remove water and alcohol.

17. A method according to claim 16, further comprising the step of curing said composition to form a condensation polymer network of silicon-oxygen-metal bonds.

18. A method according to claim 17 further comprising the step of applying said composition to the surface of a substrate, wherein said drying and curing steps are carried out on said substrate thereby forming a coating on said substrate.

19. A method according to claim 18, wherein said curing step is carried out at elevated temperature.

20. A method according to claim 19, wherein said curing step is carried out at a temperature between 80° C. and 150° C.

* * * * *

UNITED STATES PATENT AND TRADEMARK OFFICE
CERTIFICATE OF CORRECTION

PATENT NO. : 4,753,827

DATED : June 28, 1988

INVENTOR(S) : Bulent E. Yoldas and Chia-Cheng Lin

It is certified that error appears in the above-identified patent and that said Letters Patent is hereby corrected as shown below:

Claim 11, (column 6, line 38), insert "radical" after "organic".

Signed and Sealed this

Fourteenth Day of February, 1989

Attest:

DONALD J. QUIGG

Attesting Officer          Commissioner of Patents and Trademarks